US010331737B2

(12) United States Patent
Raichelgauz et al.

(10) Patent No.: US 10,331,737 B2
(45) Date of Patent: *Jun. 25, 2019

(54) SYSTEM FOR GENERATION OF A LARGE-SCALE DATABASE OF HETROGENEOUS SPEECH

(71) Applicant: Cortica, Ltd., Tel Aviv (IL)

(72) Inventors: Igal Raichelgauz, New York, NY (US); Karina Odinaev, New York, NY (US); Yehoshua Y Zeevi, Haifa (IL)

(73) Assignee: CORTICA LTD., Tel Aviv (IL)

( * ) Notice: Subject to any disclaimer, the term of this patent is extended or adjusted under 35 U.S.C. 154(b) by 171 days.

This patent is subject to a terminal disclaimer.

(21) Appl. No.: 15/140,977

(22) Filed: Apr. 28, 2016

(65) Prior Publication Data

US 2016/0239566 A1 Aug. 18, 2016

Related U.S. Application Data

(63) Continuation of application No. 14/619,767, filed on Feb. 11, 2015, now Pat. No. 9,384,196, which is a (Continued)

(30) Foreign Application Priority Data

| Oct. 26, 2005 | (IL) | 171577 |
| Jan. 29, 2006 | (IL) | 173409 |
| Aug. 21, 2007 | (IL) | 185414 |

(51) Int. Cl.
*G06K 9/00* (2006.01)
*G06F 16/22* (2019.01)
(Continued)

(52) U.S. Cl.
CPC ............ *G06F 16/685* (2019.01); *G06F 16/22* (2019.01); *G06F 16/284* (2019.01);
(Continued)

(58) Field of Classification Search
USPC .......................................................... 706/10
See application file for complete search history.

(56) References Cited

U.S. PATENT DOCUMENTS

| 4,733,353 A | 3/1988 | Jaswa |
| 4,932,645 A | 6/1990 | Schorey et al. |
| (Continued) | | |

FOREIGN PATENT DOCUMENTS

| WO | 0231764    | 4/2002 |
| WO | 0231764 A2 | 4/2002 |
| (Continued) | | |

OTHER PUBLICATIONS

Brecheisen, et al., "Hierarchical Genre Classification for Large Music Collections", ICME 2006, pp. 1385-1388.
(Continued)

*Primary Examiner* — Michael B Holmes

(57) ABSTRACT

A system for generating a large-scale database of heterogeneous speech is provided. The system comprises a processor a plurality of independent computation cores configured to generate signatures of a plurality of speech segments; a large scale database configured to maintain a plurality of transcribed multimedia signals; a memory, the memory containing instructions that, when executed by the processor, configure the system to: randomly select a plurality of speech segments from the plurality of multimedia signals, wherein each speech segment of the plurality of speech segments is of a random length; provide the plurality of speech segments to the plurality of independent computation cores for generation of the signatures; collect the signatures from the plurality of independent computation cores; and populate the large-scale database with the plurality of signatures respective of the plurality of multimedia signals.

24 Claims, 6 Drawing Sheets

Related U.S. Application Data continuation of application No. 13/682,132, filed on Nov. 20, 2012, now Pat. No. 8,990,125, which is a continuation of application No. 12/195,863, filed on Aug. 21, 2008, now Pat. No. 8,326,775, which is a continuation-in-part of application No. 12/084,150, filed as application No. PCT/IL2006/001235 on Oct. 26, 2006, now Pat. No. 8,655,801, said application No. 13/682,132 is a continuation-in-part of application No. 12/084,150, filed on Apr. 7, 2009, now Pat. No. 8,655,801.

(51) Int. Cl.
| | |
|---|---|
| *G06F 16/28* | (2019.01) |
| *G06F 16/40* | (2019.01) |
| *G06F 16/41* | (2019.01) |
| *G06F 16/61* | (2019.01) |
| *G06F 16/68* | (2019.01) |
| *G10L 13/06* | (2013.01) |
| *G10L 15/06* | (2013.01) |
| *G10L 15/26* | (2006.01) |
| *G10L 15/32* | (2013.01) |
| *G10L 25/54* | (2013.01) |
| *G10L 25/57* | (2013.01) |
| *G06F 16/683* | (2019.01) |
| *G06F 16/783* | (2019.01) |

(52) U.S. Cl.
CPC ........... *G06F 16/285* (2019.01); *G06F 16/40* (2019.01); *G06F 16/41* (2019.01); *G06F 16/61* (2019.01); *G06F 16/68* (2019.01); *G06F 16/683* (2019.01); *G06F 16/7834* (2019.01); *G06F 16/7844* (2019.01); *G06F 16/7847* (2019.01); *G06K 9/00744* (2013.01); *G10L 15/26* (2013.01); *G10L 25/54* (2013.01); *G10L 25/57* (2013.01); *G10L 13/06* (2013.01); *G10L 15/063* (2013.01); *G10L 15/32* (2013.01)

(56) References Cited

U.S. PATENT DOCUMENTS

| | | | |
|---|---|---|---|
| 4,972,363 | A | 11/1990 | Nguyen et al. |
| 5,214,746 | A | 5/1993 | Fogel et al. |
| 5,307,451 | A | 4/1994 | Clark |
| 5,568,181 | A | 10/1996 | Greenwood et al. |
| 5,638,425 | A | 6/1997 | Meador, I et al. |
| 5,745,678 | A | 4/1998 | Herzberg et al. |
| 5,763,069 | A | 6/1998 | Jordan |
| 5,806,061 | A | 9/1998 | Chaudhuri et al. |
| 5,852,435 | A | 12/1998 | Vigneaux et al. |
| 5,870,754 | A | 2/1999 | Dimitrova et al. |
| 5,873,080 | A | 2/1999 | Coden et al. |
| 5,887,193 | A | 3/1999 | Takahashi et al. |
| 5,933,527 | A | 8/1999 | Ishikawa |
| 5,978,754 | A | 11/1999 | Kumano |
| 5,991,306 | A | 11/1999 | Burns et al. |
| 6,052,481 | A | 4/2000 | Grajski et al. |
| 6,070,167 | A | 5/2000 | Qian et al. |
| 6,076,088 | A | 6/2000 | Paik et al. |
| 6,122,628 | A | 9/2000 | Castelli et al. |
| 6,137,911 | A | 10/2000 | Zhilyaev |
| 6,144,767 | A | 11/2000 | Bottou et al. |
| 6,147,636 | A | 11/2000 | Gershenson |
| 6,243,375 | B1 | 6/2001 | Speicher |
| 6,243,713 | B1 | 6/2001 | Nelson et al. |
| 6,275,599 | B1 | 8/2001 | Adler et al. |
| 6,329,986 | B1 | 12/2001 | Cheng |
| 6,381,656 | B1 | 4/2002 | Shankman |
| 6,411,229 | B2 | 6/2002 | Kobayashi |
| 6,422,617 | B1 | 7/2002 | Fukumoto et al. |
| 6,507,672 | B1 | 1/2003 | Watkins et al. |
| 6,523,046 | B2 | 2/2003 | Liu et al. |
| 6,524,861 | B1 | 2/2003 | Anderson |
| 6,539,100 | B1 | 3/2003 | Amir et al. |
| 6,550,018 | B1 | 4/2003 | Abonamah et al. |
| 6,557,042 | B1 | 4/2003 | He et al. |
| 6,594,699 | B1 | 7/2003 | Sahai et al. |
| 6,601,026 | B2 | 7/2003 | Appelt et al. |
| 6,611,628 | B1 | 8/2003 | Sekiguchi et al. |
| 6,618,711 | B1 | 9/2003 | Ananth |
| 6,643,620 | B1 | 11/2003 | Contolini et al. |
| 6,643,643 | B1 | 11/2003 | Lee et al. |
| 6,665,657 | B1 | 12/2003 | Dibachi |
| 6,704,725 | B1 | 3/2004 | Lee |
| 6,732,149 | B1 | 5/2004 | Kephart |
| 6,751,363 | B1 | 6/2004 | Natsev et al. |
| 6,751,613 | B1 | 6/2004 | Lee et al. |
| 6,754,435 | B2 | 6/2004 | Kim |
| 6,763,069 | B1 | 7/2004 | Divakaran et al. |
| 6,763,519 | B1 | 7/2004 | McColl et al. |
| 6,774,917 | B1 | 8/2004 | Foote et al. |
| 6,795,818 | B1 | 9/2004 | Lee |
| 6,804,356 | B1 | 10/2004 | Krishnamachari |
| 6,813,395 | B1 | 11/2004 | Kinjo |
| 6,816,857 | B1 | 11/2004 | Weissman et al. |
| 6,819,797 | B1 | 11/2004 | Smith et al. |
| 6,845,374 | B1 | 1/2005 | Oliver et al. |
| 6,901,207 | B1 | 5/2005 | Watkins |
| 6,938,025 | B1 | 8/2005 | Lulich et al. |
| 6,963,659 | B2 | 11/2005 | Tumey et al. |
| 6,985,172 | B1 | 1/2006 | Rigney et al. |
| 7,006,689 | B2 | 2/2006 | Kasutani |
| 7,013,051 | B2 | 3/2006 | Sekiguchi et al. |
| 7,020,654 | B1 | 3/2006 | Najmi |
| 7,043,473 | B1 | 5/2006 | Rassool et al. |
| 7,158,681 | B2 | 1/2007 | Persiantsev |
| 7,199,798 | B1 | 4/2007 | Echigo et al. |
| 7,215,828 | B2 | 5/2007 | Luo |
| 7,248,300 | B1 | 7/2007 | Ono |
| 7,260,564 | B1 | 8/2007 | Lynn et al. |
| 7,277,928 | B2 | 10/2007 | Lennon |
| 7,299,261 | B1 | 11/2007 | Oliver et al. |
| 7,302,117 | B2 | 11/2007 | Sekiguchi et al. |
| 7,313,805 | B1 | 12/2007 | Rosin et al. |
| 7,340,358 | B2 | 3/2008 | Yoneyama |
| 7,353,224 | B2 | 4/2008 | Chen et al. |
| 7,376,672 | B2 | 5/2008 | Weare |
| 7,433,895 | B2 | 10/2008 | Li et al. |
| 7,464,086 | B2 | 12/2008 | Black et al. |
| 7,526,607 | B1 | 4/2009 | Singh et al. |
| 7,529,659 | B2 | 5/2009 | Wold |
| 7,574,668 | B2 | 8/2009 | Nunez et al. |
| 7,577,656 | B2 | 8/2009 | Kawai et al. |
| 7,657,100 | B2 | 2/2010 | Gokturk et al. |
| 7,660,468 | B2 | 2/2010 | Gokturk et al. |
| 7,694,318 | B2 | 4/2010 | Eldering et al. |
| 7,836,054 | B2 | 11/2010 | Kawai et al. |
| 7,920,894 | B2 | 4/2011 | Wyler |
| 7,921,107 | B2 | 4/2011 | Chang et al. |
| 7,933,407 | B2 | 4/2011 | Keidar et al. |
| 7,974,994 | B2 | 7/2011 | Li et al. |
| 7,987,194 | B1 | 7/2011 | Walker et al. |
| 7,987,217 | B2 | 7/2011 | Long et al. |
| 7,991,715 | B2 | 8/2011 | Schiff et al. |
| 8,000,655 | B2 | 8/2011 | Wang et al. |
| 8,023,739 | B2 | 9/2011 | Hohimer et al. |
| 8,036,893 | B2 | 10/2011 | Reich |
| 8,098,934 | B2 | 1/2012 | Vincent et al. |
| 8,112,376 | B2 | 2/2012 | Raichelgauz et al. |
| 8,266,185 | B2 | 9/2012 | Raichelgauz et al. |
| 8,312,031 | B2 | 11/2012 | Raichelgauz et al. |
| 8,315,442 | B2 | 11/2012 | Gokturk et al. |
| 8,316,005 | B2 | 11/2012 | Moore |
| 8,326,775 | B2 * | 12/2012 | Raichelgauz ..... G06F 17/30595 706/10 |
| 8,345,982 | B2 | 1/2013 | Gokturk et al. |
| 8,457,827 | B1 | 6/2013 | Ferguson et al. |
| 8,495,489 | B1 | 7/2013 | Everingham |

(56) References Cited

U.S. PATENT DOCUMENTS

| | | |
|---|---|---|
| 8,548,828 B1 | 10/2013 | Longmire |
| 8,655,801 B2 * | 2/2014 | Raichelgauz .......... G06N 3/063 706/12 |
| 8,655,878 B1 | 2/2014 | Kulkarni et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,856,051 B1 | 10/2014 | Song et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 * | 3/2015 | Raichelgauz ..... G06F 17/30595 706/10 |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,111,134 B1 | 8/2015 | Rogers et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,384,196 B2 * | 7/2016 | Raichelgauz ..... G06F 17/30746 |
| 9,438,270 B2 | 9/2016 | Raichelgauz et al. |
| 9,466,068 B2 | 10/2016 | Raichelgauz et al. |
| 9,606,992 B2 | 3/2017 | Geisner et al. |
| 9,646,006 B2 | 5/2017 | Raichelgauz et al. |
| 9,679,062 B2 | 6/2017 | Schillings et al. |
| 9,798,795 B2 * | 10/2017 | Raichelgauz ........... G10L 15/26 |
| 9,807,442 B2 | 10/2017 | Bhatia et al. |
| 9,984,369 B2 | 5/2018 | Li et al. |
| 10,193,990 B2 * | 1/2019 | Raichelgauz ........... H04L 67/22 |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0105739 A1 | 6/2003 | Essafi et al. |
| 2003/0123713 A1 | 7/2003 | Geng |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0264744 A1 | 12/2004 | Zhang et al. |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0172130 A1 | 8/2005 | Roberts |
| 2005/0177372 A1 | 8/2005 | Wang et al. |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2006/0288002 A1 | 12/2006 | Epstein et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |

(56) References Cited

U.S. PATENT DOCUMENTS

| | | |
|---|---|---|
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0024641 A1 | 1/2009 | Quigley et al. |
| 2009/0043637 A1 | 2/2009 | Eder |
| 2009/0043818 A1* | 2/2009 | Raichelgauz ..... G06F 17/30595 |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0216761 A1 | 8/2009 | Raichelgauz et al. |
| 2009/0220138 A1 | 9/2009 | Zhang et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1 | 10/2009 | Redlich et al. |
| 2009/0259687 A1 | 10/2009 | Mai et al. |
| 2009/0277322 A1 | 11/2009 | Cai et al. |
| 2009/0282218 A1 | 11/2009 | Raichelgauz et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0198626 A1 | 8/2010 | Cho et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2010/0325138 A1 | 12/2010 | Lee et al. |
| 2010/0325581 A1 | 12/2010 | Finkelstein et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0164180 A1 | 7/2011 | Lee |
| 2011/0164810 A1 | 7/2011 | Zang et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0197857 A1 | 8/2012 | Huang et al. |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0080433 A1* | 3/2013 | Raichelgauz ..... G06F 17/30595 707/736 |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0226930 A1 | 8/2013 | Arngren et al. |
| 2013/0283401 A1 | 10/2013 | Pabla et al. |
| 2013/0311924 A1 | 11/2013 | Denker et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0147829 A1 | 5/2014 | Jerauld |
| 2014/0152698 A1 | 6/2014 | Kim et al. |
| 2014/0156901 A1* | 6/2014 | Raichelgauz .......... G06N 3/049 710/305 |
| 2014/0169681 A1 | 6/2014 | Drake |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341476 A1 | 11/2014 | Kulick et al. |
| 2015/0100562 A1 | 4/2015 | Kohlmeier et al. |
| 2015/0154189 A1* | 6/2015 | Raichelgauz ..... G06F 17/30746 707/803 |
| 2015/0254344 A1 | 9/2015 | Kulkarni et al. |
| 2015/0286742 A1 | 10/2015 | Zhang et al. |
| 2015/0289022 A1 | 10/2015 | Gross |
| 2015/0324356 A1 | 11/2015 | Gutierrez et al. |
| 2016/0007083 A1 | 1/2016 | Gurha |
| 2016/0026707 A1 | 1/2016 | Ong et al. |
| 2016/0239566 A1* | 8/2016 | Raichelgauz .......... G06F 16/685 |
| 2016/0321253 A1* | 11/2016 | Raichelgauz .......... H04H 60/46 |
| 2016/0321256 A1* | 11/2016 | Raichelgauz ...... G06K 9/00281 |
| 2016/0342593 A1* | 11/2016 | Raichelgauz ....... G06F 16/9535 |
| 2016/0378755 A1* | 12/2016 | Raichelgauz .......... H04L 67/306 707/737 |
| 2017/0017638 A1 | 1/2017 | Satyavarta et al. |
| 2017/0154241 A1 | 6/2017 | Shambik et al. |
| 2017/0262437 A1* | 9/2017 | Raichelgauz .......... H04L 67/22 |
| 2018/0018337 A1* | 1/2018 | Raichelgauz .......... H04L 67/06 |
| 2018/0039626 A1* | 2/2018 | Raichelgauz ...... G06K 9/00281 |
| 2018/0150467 A1* | 5/2018 | Raichelgauz .......... H04H 60/46 |

FOREIGN PATENT DOCUMENTS

| | | |
|---|---|---|
| WO | 2003005242 A1 | 1/2003 |
| WO | 2003067467 A1 | 8/2003 |
| WO | 2004019527 A1 | 3/2004 |
| WO | 2005027457 A1 | 3/2005 |
| WO | 2007049282 A2 | 5/2007 |
| WO | WO2007049282 | 5/2007 |
| WO | 2014076002 A1 | 5/2014 |

(56) References Cited

FOREIGN PATENT DOCUMENTS

| WO | 2014137337 A1 | 9/2014 |
|---|---|---|
| WO | 2016040376 A1 | 3/2016 |
| WO | 2016070193 A1 | 5/2016 |

OTHER PUBLICATIONS

Chuan-Yu Cho, et al., "Efficient Motion-Vector-Based Video Search Using Query by Clip", 2004, IEEE, Taiwan, pp. 1-4.
Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and Browsing", IEEE, vol. 13, No. 7, Jul. 2004, pp. 1-19.
Shih-Fu Chang, et al., "VideoQ: A Fully Automated Video Retrieval System Using Motion Sketches", 1998, IEEE, , New York, pp. 1-2.
Wei-Te Li et al., "Exploring Visual and Motion Saliency for Automatic Video Object Extraction", IEEE, vol. 22, No. 7, Jul. 2013, pp. 1-11.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM. 2015.7314122 IEEE Conference Publications.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/ NetSys.2015.7089081 IEEE Conference Publications.
Odinaev, et al., "Cliques in Neural Ensembles as Perception Carriers", Technion—Israel Institute of Technology, 2006 International Joint Conference on Neural Networks, Canada, 2006, pp. 285-292.
The International Search Report and the Written Opinion for PCT/US2016/054634 dated Mar. 16, 2017, ISA/RU, Moscow, RU.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2017/015831, ISA/RU, Moscow, Russia, dated Apr. 20, 2017.
Gomes et al., "Audio Watermaking and Fingerprinting: For Which Applications?" University of Rene Descartes, Paris, France, 2003.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
May et al., "The Transputer", Springer-Verlag, Berlin Heidelberg, 1989, teaches multiprocessing system.
Nam, et al., "Audio Visual Content-Based Violent Scene Characterization", Department of Electrical and Computer Engineering, Minneapolis, MN, 1998, pp. 353-357.
Vailaya, et al., "Content-Based Hierarchical Classification of Vacation Images," I.E.E.E.: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Whitby-Strevens, "The Transputer", 1985 IEEE, Bristol, UK.

Yanai, "Generic Image Classification Using Visual Knowledge on the Web," MM'03, Nov. 2-8, 2003, Tokyo, Japan, pp. 167-176.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Boari et al, "Adaptive Routing for Dynamic Applications in Massively Parallel Architectures", 1995 IEEE, Spring 1995.
Cernansky et al., "Feed-forward Echo State Networks"; Proceedings of International Joint Conference on Neural Networks, Montreal, Canada, Jul. 31-Aug. 4, 2005; Entire Document.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Foote, Jonathan et al., "Content-Based Retrieval of Music and Audio"; 1997, Institute of Systems Science, National University of Singapore, Singapore (ABSTRACT).
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004. 1434102 IEEE Conference Publications, Hong Kong.
Guo et al, "AdOn: An Intelligent Overlay Video Advertising System", SIGIR, Boston, Massachusetts, Jul. 19-23, 2009.
Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.
International Search Report for the corresponding International Patent Application PCT/IL2006/001235; dated Nov. 2, 2008.
IPO Examination Report under Section 18(3) for corresponding UK application No. GB1001219.3, dated May 30, 2012.
IPO Examination Report under Section 18(3) for corresponding UK application No. GB1001219.3, dated Sep. 12, 2011.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251 German National Research Center for Information Technology.
Lin, C.; Chang, S.;, "Generating Robust Digital Signature for Image/Video Authentication, "Multimedia and Security Workshop at ACM Multimedia '98. Bristol, U.K. Sep. 1998, pp. 49-54.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

(56) References Cited

OTHER PUBLICATIONS

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Semizarov et al. "Specificity of Short Interfering RNA Determined through Gene Expression Signatures", PNAS, 2003, pp. 6347-6352.
Theodoropoulos et al, "Simulating Asynchronous Architectures on Transputer Networks", Proceedings of the Fourth Euromicro Workshop on Parallel and Distributed Processing, 1996. PDP '96.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002; Entire Document.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
Schneider, et. al., "A Robust Content Based Digital Signature for Image Authentication", Proc. ICIP 1996, Laussane, Switzerland, Oct. 1996, pp. 227-230.
Yanagawa, et al., "Columbia University's Baseline Detectors for 374 LSCOM Semantic Visual Concepts." Columbia University ADVENT technical report, 2007, pp. 222-2006-8.
Stewart, et al., "Independent Component Representations for Face Recognition", Proceedings of the SPIE Symposium on Electronic Imaging III, San Jose, California, Jan. 1998, pp. 1-12.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Hogue, "Tree Pattern Inference and Matching for Wrapper Induction on the World Wide Web", Master's Thesis, Massachusetts Institute of Technology, Jun. 2004, pp. 1-106.
Hogue, "Tree Pattern Inference and Matching for Wrapper Induction on the World Wide Web", Master's Thesis, Massachusetts Institute of Technology, 2004, pp. 1-106.
Howlett et al, "A Multi-Computer Neural Network Architecture in a Virtual Sensor System Application", International Journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.

(56) References Cited

OTHER PUBLICATIONS

International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on CONTROL '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al, "HIBRID-SOC: A Mul ti-Core SOC Architecture for Mul timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.

* cited by examiner

Signature:

| 0 | 1 | 0 | 0 | 0 | 1 | 1 | 0 | 1 | 0 | 1 | 1 | ... |

Robust Signature:

| 0 | 0 | 0 | 0 | 0 | *1* | 0 | 0 | 0 | 0 | *1* | *1* | ... |

SYSTEM FOR GENERATION OF A LARGE-SCALE DATABASE OF HETROGENEOUS SPEECH

CROSS REFERENCE TO RELATED APPLICATIONS

This application is a continuation of U.S. patent application Ser. No. 14/619,767 filed on Feb. 11, 2015, now allowed, which is a continuation of U.S. patent application Ser. No. 13/682,132 filed on Nov. 20, 2012, now U.S. Pat. No. 8,990,125, which is a continuation of U.S. patent application Ser. No. 12/195,863 filed Aug. 21, 2008, now U.S. Pat. No. 8,326,775. The Ser. No. 13/682,132 application is a continuation-in-part of U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on Jan. 29, 2006. The Ser. No. 12/195,863 application is also a continuation-in-part of the Ser. No. 12/084,150 application. The Ser. No. 12/195,863 application also claims priority under 35 USC 119 from Israeli Application No. 185414, filed on Aug. 21, 2007. All of the applications referenced above are herein incorporated by reference.

TECHNICAL FIELD

The disclosure generally relates to content-based clustering, recognition, classification and search of high volumes of multimedia data in real-time, and more specifically to generation of signatures of high volumes of multimedia content-segments in real-time.

BACKGROUND

With the abundance of multimedia data made available through various means in general and the Internet and world-wide web (WWW) in particular, there is also a need to provide for effective ways of searching for such multimedia data. Searching for multimedia data in general and video data in particular may be challenging at best due to the huge amount of information that needs to be checked. Moreover, when it is necessary to find a specific content of video, existing solutions revert to using various metadata that describes the content of the multimedia data. However, such content may be complex by nature and, therefore, not necessarily adequately documented as metadata.

The rapidly increasing number and size of multimedia databases, accessible for example through the Internet, call for the application of effective means for search-by-content. Searching for multimedia in general and for video data in particular is challenging due to the huge amount of information that has to be classified. Moreover, existing solutions revert to model-based methods to define and/or describe multimedia data. Some other existing solutions can determine whether an image that matches a known image to classify the content in the image. Those solutions cannot, however, may be unable to identify a match if, for example, content within the known image is of a different color, shown at a different angle, and so on.

By its very nature, the structure of such multimedia data may be too complex to be adequately represented by means of metadata. The difficulty arises in cases where the target sought for multimedia data cannot be adequately defined in words, or respective metadata of the multimedia data. For example, it may be desirable to locate a car of a particular model in a large database of video clips or segments. In some cases, the model of the car would be part of the metadata, but in many cases it would not. Moreover, the car may be at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "The Architecture") typically consists of a large ensemble of randomly, independently, generated, heterogeneous processing cores, mapping in parallel data-segments onto a high-dimensional space and generating compact signatures for classes of interest. The Architecture is based on a PCT patent application number WO 2007/049282 and published on May 3, 2007, entitled "A Computing Device, a System and a Method for Parallel Processing of Data Streams", assigned to common assignee, and is hereby incorporated by reference for all the useful information it contains.

It would be advantageous to use The Architecture to overcome the limitations of the prior art described hereinabove. Specifically, it would be advantageous to show a framework, a method, a system, and respective technological implementations and embodiments, for large-scale matching-based multimedia deep content classification, that overcomes the well-known limitations of the prior art.

SUMMARY

Certain embodiments disclosed herein include a system for generating a large-scale database of heterogeneous speech. The system comprises a processor; a plurality of independent computation cores configured to generate signatures of a plurality of speech segments; a large scale database configured to maintain a plurality of transcribed multimedia signals; a memory, the memory containing instructions that, when executed by the processor, configure the system to: randomly select a plurality of speech segments from the plurality of multimedia signals, wherein each speech segment of the plurality of speech segments is of a random length; provide the plurality of speech segments to the plurality of independent computation cores for generation of the signatures; collect the signatures from the plurality of independent computation cores; and populate the large-scale database with the plurality of signatures respective of the plurality of multimedia signals.

Certain embodiments disclosed herein also include a method for generating a large-scale database of heterogeneous speech. The method comprises randomly selecting a plurality of speech segments from a plurality of transcribed multimedia signals, wherein each speech segment of the plurality of speech segments is of a random length; generating signatures of the plurality of randomly selected speech segments; and populating a large-scale database with the plurality of signatures respective of the plurality of multimedia signals.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
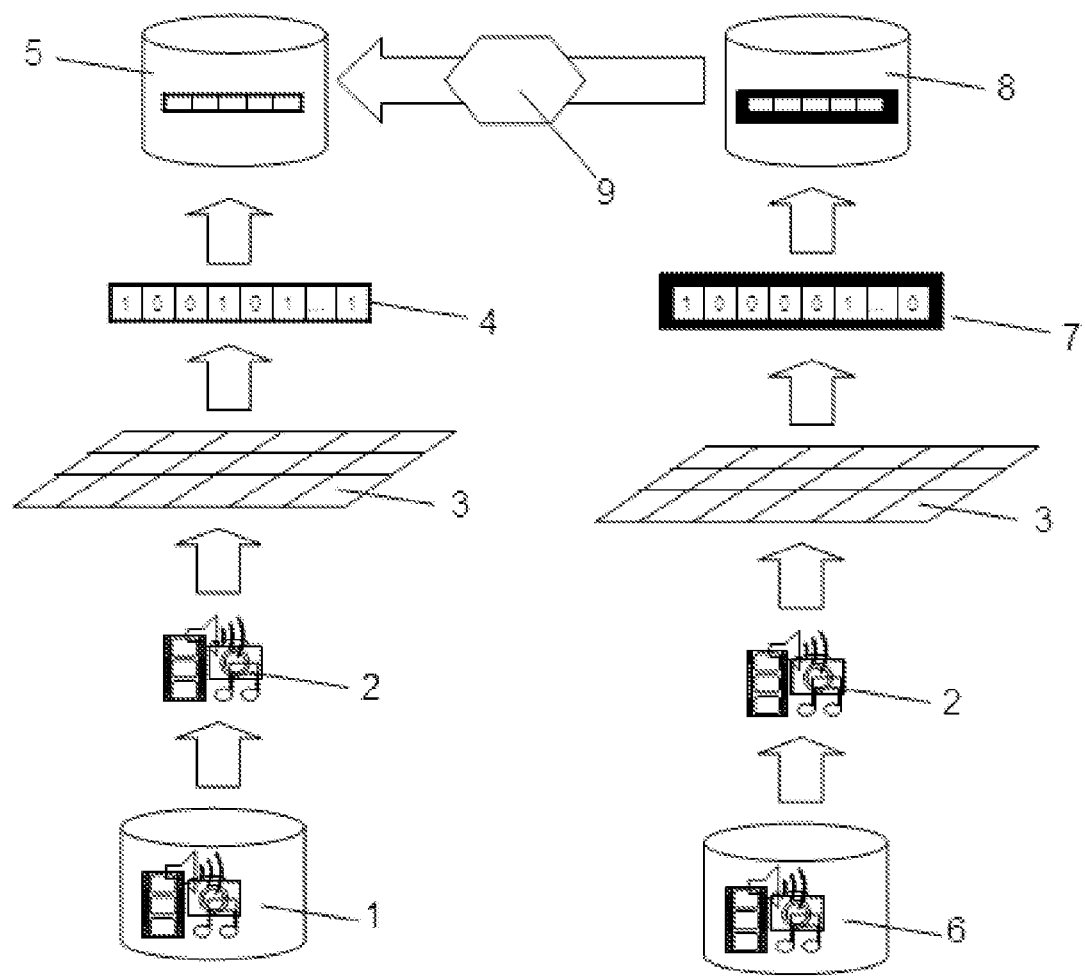
FIG. 1 is the block diagram showing the basic flow of a large-scale video matching system implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views Certain embodiments of disclosed herein include a framework, a method, a system, and their technological implementations and embodiments, for large-scale matching-based multimedia Deep Content Classification (DCC). The system is based on an implementation of a computational architecture ("The Architecture") based on "A Computing Device, a System and a Method for Parallel Processing of Data Streams" technology, having a PCT patent application number WO 2007/049282 and published on May 3, 2007. The Architecture consists of a large ensemble of randomly, independently, generated, heterogeneous processing computational cores, mapping in parallel data-segments onto a high-dimensional space and generating compact signatures for classes of interest.

In accordance with the principles of the disclosed embodiments, a realization of The Architecture embedded in a large-scale matching system ("The System") for multimedia DCC is disclosed. The System receives as an input stream, multimedia content segments, injected in parallel to all computational cores. The computational cores generate compact signatures for the specific content segment, and/or for a certain class of equivalence and interest of content-segments. For large-scale volumes of data, the signatures are stored in a conventional way in a database of size N, thereby allowing matching between the generated signatures of a certain content-segment and the signatures in the database, in low-cost, in terms of complexity, i.e. <=O(log N), and response time.

For the purpose of explaining the principles of the disclosure there are now demonstrated two embodiments: a Large-Scale Video Matching System; and a Large-Scale Speech-to-Text System. However, it is appreciated that other embodiments will be apparent to one of ordinary skill in the art.

Characteristics and advantages of the System include, but are not limited to:

The System is flat and generates signatures at an extremely high throughput rate;

The System generates robust natural signatures, invariant to various distortions of the signal;

The System is highly-scalable for high-volume signatures generation;

The System is highly-scalable for matching against large-volumes of signatures;

The System generates Robust Signatures for exact-match with low-cost, in terms of complexity and response time;

The System accuracy is scalable versus the number of computational cores, with no degradation effect on the throughput rate of processing;

The throughput of The System is scalable with the number of computational threads, and is scalable with the platform for computational cores implementation, such as FPGA, ASIC, etc.; and The signatures produced by The System are task-independent, thus the process of classification, recognition and clustering can be done independently from the process of signatures generation, in the superior space of the generated signatures.

Large-Scale Video Matching System

The goal of a large-scale video matching system is effectively to find matches between members of large-scale Master DB of video content-segments and a large-scale Target DB of video content-segments. The match between two video content segments should be invariant to a certain set of statistical distortions performed independently on two relevant content-segments. Moreover, the process of matching between a certain content-segment from Master DB to Target DB consisting of N segments, cannot be done by matching directly the Master content-segment to all N Target content-segments, for large-scale N, since such a complexity of O(N), will lead to non-practical response times. Thus, the representation of content-segments by both Robust Signatures and Signatures is critical application-wise. The System embodies a specific realization of The Architecture for the purpose of Large-Scale Video Matching System.

A high-level description of the process for large-scale video matching is depicted in FIG. 1. Video content segments (2) from Master and Target databases (6) and (1) are processed in parallel by a large number of independent computational Cores (3) that constitute the Architecture. Further details are provides in the cores generator for Large-Scale Video Matching System section below. The independent Cores (3) generate a database of Robust Signatures and Signatures (4) for Target content-segments (5) and a database of Robust Signatures and Signatures (7) for Master content-segments (8). The process of signature generation is shown in detail in FIG. 6. Finally, Target Robust Signatures and/or Signatures are effectively matched, by matching algorithm (9), to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. This is further described in the cores generator for Large-Scale Video Matching System section. The system is extensible for signatures generation capturing the dynamics in-between the frames.

Signature Generation

Creation of Signature Robust to Additive Noise

Assuming L computational cores, generated for Large-Scale Video Matching System. A frame i is injected to all the cores. The cores generate two binary response vectors the Signature $\vec{S}$ and Robust Signature $\vec{RS}$.

For generation of signatures robust to additive noise, such as White-Gaussian-Noise, scratch, etc., but not robust to distortions, such as crop, shift and rotation, the core $C_i=\{n_i\}$ may consist of a single (LTU) node or more than one node. The node equations are:

$$V_i = \sum_j w_{ij} k_j$$

where, $n_i=\theta(V_i-Th_x)$; $\theta$ is a Heaviside step function; $w_{ij}$ is a coupling node unit (CNU) between node i and image component j (for example, grayscale value of a certain pixel j);

$k_j$ is an image component j (for example, grayscale value of a certain pixel j);

$Th_x$ is a constant Threshold value where x is 'S' for Signature and 'RS' for Robust Signature; and $V_i$ is a coupling node value.

Figures 2, 3:
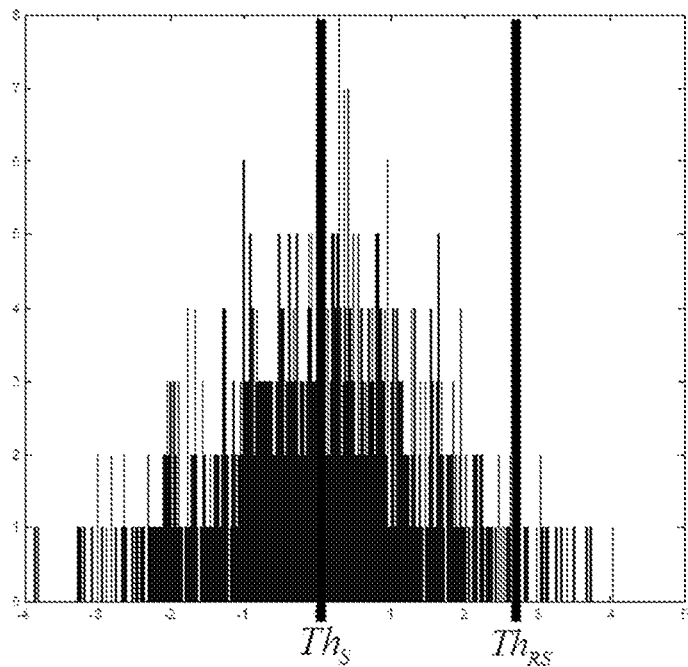
FIG. 2 is a bars-plot showing an exemplary distribution of values of a coupling node.
FIG. 3 is an example of a Signature and a corresponding Robust Signature for a certain frame.

The Threshold $Th_x$ values are set differently for Signature generation and for Robust Signature generation. For example, as shown in FIG. 2, for a certain distribution of $V_i$ values (for the set of nodes), the thresholds for Signature $Th_S$ and Robust Signature $Th_{RS}$ are set apart, after optimization, according to the following criteria:

I: For:

$V_i > Th_{RS}$ $1-p(V>Th_S) = 1-(1-\varepsilon)^l \ll 1$ i.e., given that l nodes (cores) constitute a Robust Signature of a certain image I, the probability that not all of these l nodes will belong to the Signature of same, but noisy image, Ĩ is sufficiently low (according to a system's specified accuracy).

II:

$p(V_i > Th_{RS}) \approx l/L$ i.e., approximately l out of the total L nodes can be found to generate Robust Signatures according to the above definition.

III: Both Robust Signature and Signature are generated for a certain frame i. An example for generating Robust Signature and Signature for a certain frame is provided in FIG. 3.

Creation of Signatures Robust to Noise and Distortions

Assume L denotes the number of computational cores in the System. Having generated L cores by the core generator that constitute the Large-Scale Video Matching System, a frame i is injected to all the computational cores. The computational cores map the image frame onto two binary response vectors: the Signature $\vec{S}$ and the Robust Signature $\vec{RS}$.

In order to generate signatures robust to additive noises, such as White-Gaussian-Noise, scratch, etc., and robust to distortions, such as crop, shift and rotation, etc., the core $C_i$ should consist of a group of nodes (LTUs): $C_i=\{n_{im}\}$, where m is the number of nodes in each core i, generated according to certain statistical process, modeling variants of certain set of distortions.

The first step in generation of distortions-invariant signatures is to generate m Signatures and Robust Signatures, based on each of the m nodes in all the L cores, according to the algorithm described herein above. The next step is to determine a subset V of m potential signatures-variants for a certain frame i. This is done by defining a certain consistent and robust selection criterion, for example, select top f signature-variants out of m, with highest firing-rate across all L computational cores. The reduced set will be used as Signature and Robust Signature, invariant to distortions which were defined and used in the process of computational cores generation.

Computational Cores Generation

Computational Cores Generation is a process of definition, selection, and tuning of the Architecture parameters for a certain realization in specific system and application. The process is based on several design considerations, such as:

(a) The cores should be designed so as to obtain maximal independence, i.e., the projection from a signal space should generate a maximal pair-wise distance between any two computational cores' projections in a high-dimensional space.

(b) The computational cores should be optimally designed for the type of signals, i.e. the computational cores should be maximally sensitive to the spatio-temporal structure of the injected signal, for example, and in particular, sensitive to local correlations in time and space.

(c) The computational cores should be optimally designed with regard to invariance to set of signal distortions, of interest in relevant application.

Following is a non-limiting example of core-generator module for large-scale video-matching system. The first step is a generation of L nodes, 1 for each of the L computational cores, following design optimization criteria (a) and (b).

Criterion (a) is implemented by formulating it as a problem of generating L projections, sampling uniformly a D-dimensional hemisphere. This problem cannot be solved analytically for an arbitrary L. However, there are singular solutions, obtained by Neil Sloane for a certain number of points for a given dimension. The definition of core-generator stochastic process is based on this singular solution. Another constraint embedded in this process definition is local distribution of coupling node currents (CNCs) according to design optimization criterions (b), i.e. the sparse connectivity has local characteristics in image space. Other solutions of almost uniform tessellations exist.

The second step is to fulfill design optimization criterion (c), by generating for each of the nodes of the computational cores, M variants, so that the cores will produce signatures robust to specific distortions of interest. This is done by applying to the functions of each node M.

Large-Scale Speech-to-Text System

The goal of large-scale speech-to-text system is to reliably translate fluent prior art technologies are based on model-based approaches, i.e., speech recognition through phonemes recognition and/or word recognition by Hidden-Markov-Models (HMM) and other methods, natural-language-processing techniques, language models and more, the disclosed approach constitutes a paradigm-shift in the speech-recognition domain. The disclosed System for speech-to-text is based on a previously-disclosed computational paradigm-shift, The Architecture.

Figure 4:
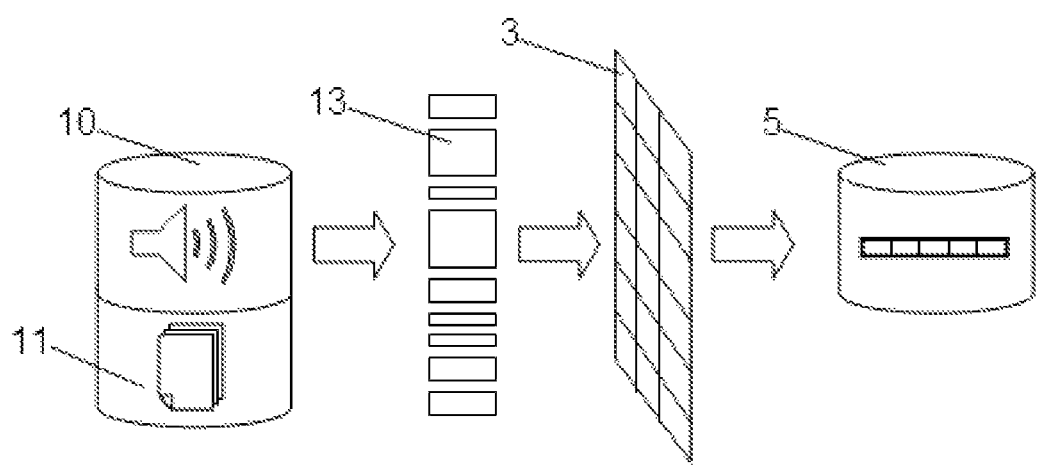
FIG. 4 is a diagram depicting the process of generating a signature for a segment of speech implemented in accordance with an embodiment.

FIG. 4 shows high-level steps for generating a signature for a voice segment implemented according to an embodiment. The System receives a large-scale database of speech (10) with relevant database of text (11) and generates a database of Robust Signatures (5) to patches of the speech signals (13) provided in the original database.

Figure 5:
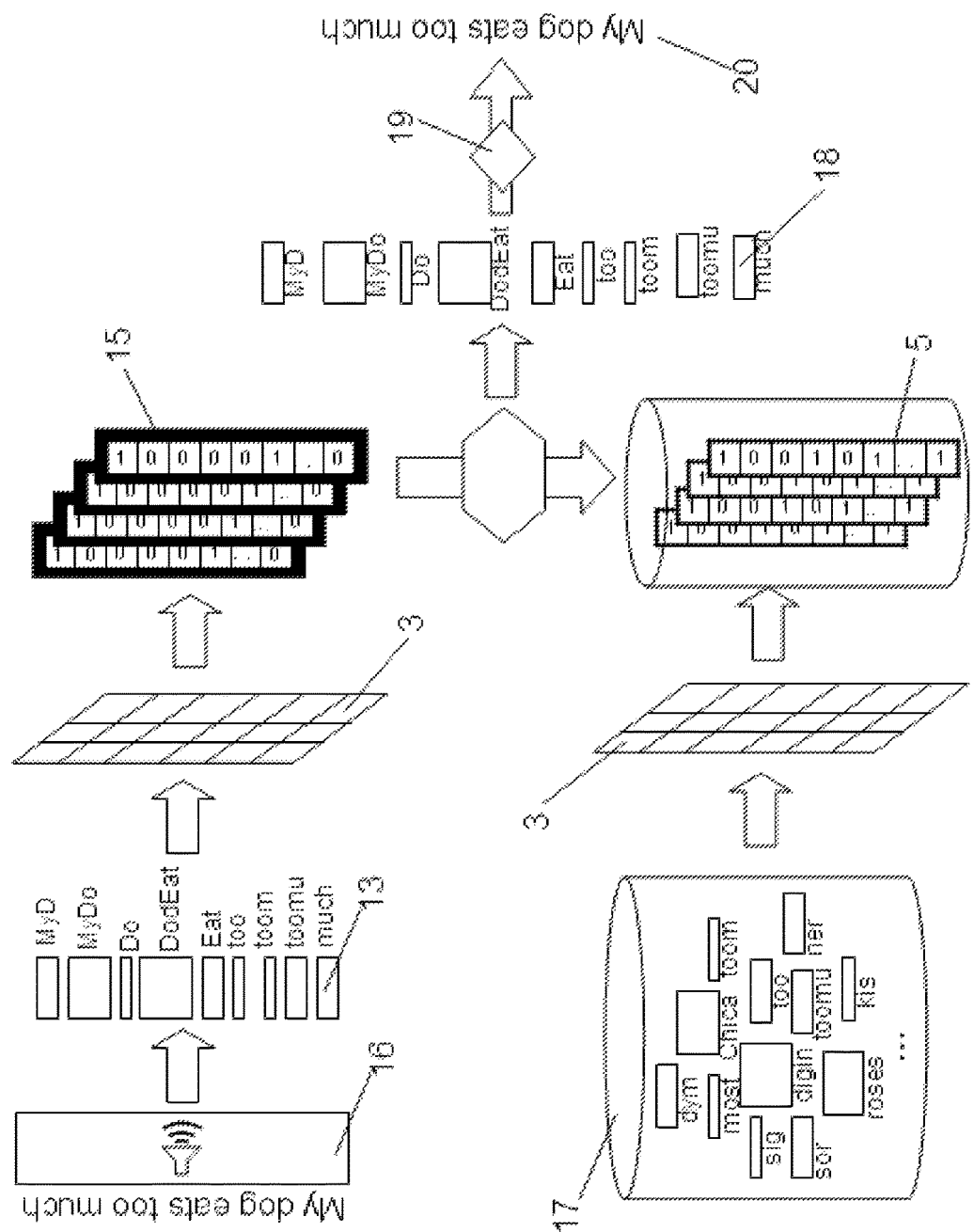
FIG. 5 is a diagram depicting a process executed by a Large-Scale Speech-to-Text System according to an embodiment.

FIG. 5 shows an exemplary more detailed overall process of speech-to-text translation implemented in accordance with certain embodiments of the disclosure. In the process of speech-to-text translation, the system performs first speech-to-speech match, i.e. the system finds M best matches (18) between the speech-segment received as an input (16), and the N speech-segments provided in the training database (17). Similar to the case of visual signal, the match between two speech-segments should be invariant to a certain set of statistical processes performed independently on two relevant speech-segments, such as generation of the speech by different speakers, plurality noisy channels, various intonations, accents and more. Moreover, the process of matching between a certain speech-segment to a database consisting of N segments, cannot be done by matching directly the speech-segment to all N speech-segments, for large-scale N, since such a complexity of O(N), will lead to non-practical response times. Thus, the representation of speech-segments by Robust Signatures is critical application-wise. The System embodies a specific realization of The Architecture for the purpose of Large-Scale Speech-to-Speech System creation and definition. Finally, after matching the speech-segment to M best matches in database, the relevant text attached to the M segments is post-processed (19), generating the text (20) of the speech-segment provided as an input.

High-level description of the system is further depicted, in FIG. 5. Speech-segments are processes by computational Cores (3), a realization of The Architecture (see cores generator for Large-Scale Speech-to-Text System). The computational Cores (3) generate a database of Signatures (5) for a large-scale database of speech-segments (17) and Robust Signatures (15) for speech-segment presented as an input (16). The process of signature generation is described below. Next, Robust Signatures (15) and/or Signatures (5) are effectively matched to Robust Signatures (15) and/or Signatures (5) in the database to find all matches between the two, and finally extract all the relevant text to be post-processed and presented as a text output (20).

Signatures Generation

Figure 6:
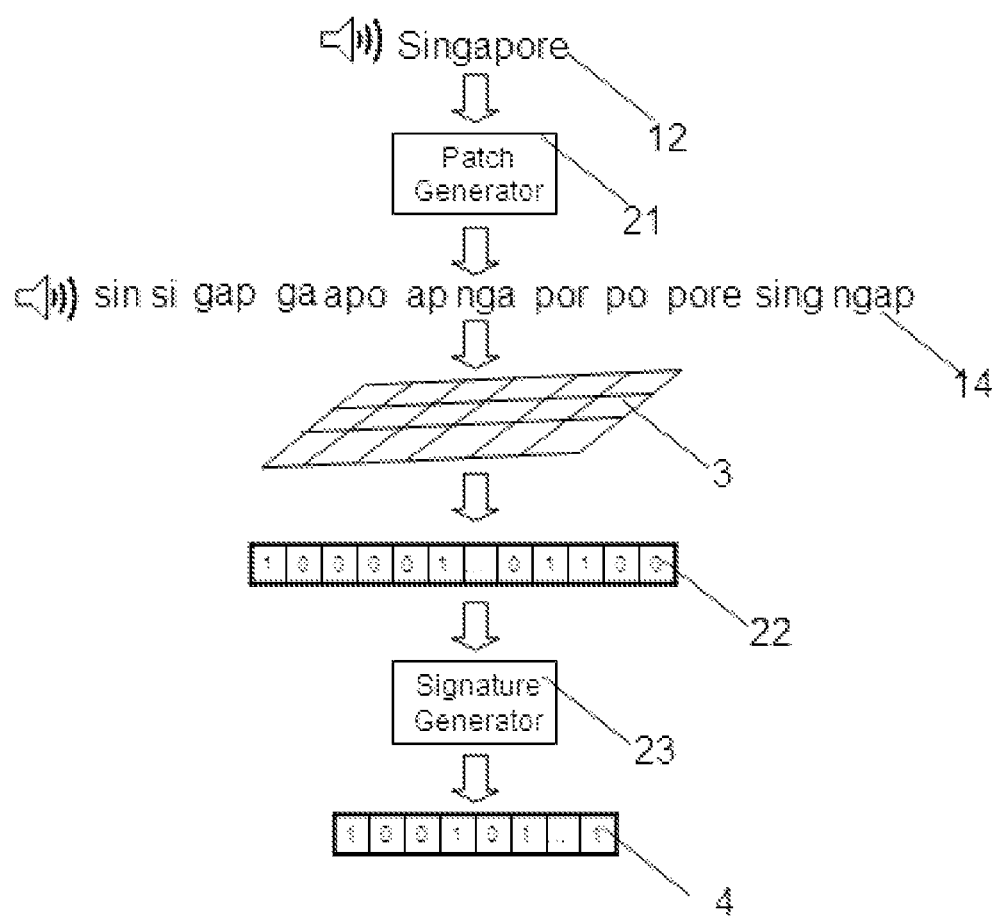
FIG. 6 is a diagram showing the flow of patches generation, response vector generation, and signature generation in a Large-Scale Speech-to-Text System according to an embodiment.

The signatures generation process will be described with reference to FIG. 6. The first step in the process of signatures generation from a given speech-segment is to break-down the speech-segment to K patches (14) of random length P and random position within the speech segment (12). The break-down is performed by the patch generator component (21). The value of K and the other two parameters are determined based on optimization, considering the tradeoff between accuracy rate and the number of fast matches required in the flow process of the System.

In the next step, all the K patches are injected in parallel to all L computational Cores (3) to generate K response vectors (22).

Having L computational cores, generated by the cores generator for Large-Scale Speech-to-Text System, a patch i is injected to all the computational cores. Processing by the computational cores yields a response vector $\vec{R}$, for example, in the following way:

A computational core $C_i$ consists of a m nodes (LTUs), generated according to cores-generator: $C_i = \{n_{im}\}$.

$$n_{im}(t) = \theta(V_i(t) - Th)$$
$$V_i(t) = (1-L)V_i(t-1) + V_{im}$$
$$V_{im} = \sum_j w_{i,jn} k_{i,j}$$

$w_{ij}$ is a CNU between node j (in Core i) and patch component n (for example, MFCC coefficient), and/or between node j and node n in the same core i.

$k_{i,j}$ is a patch component n (for example, MFCC coefficient), and/or node j and node n in the same core i.

θ is a Heaviside step function; and

TH is a constant threshold value of all nodes.

The response vector $\vec{R}$ is the firing rate of all nodes, $\{n_{im}\}$. The Signature (4) and the Robust Signature may be generated, for example, similarly as to the case of video content-segment, i.e., $\vec{S}$ by applying the threshold $\vec{Th_S}$ to $\vec{R}$, and $\vec{RS}$ by applying the threshold $\vec{Th_{RS}}$ to $\vec{R}$.

Speech-to-Speech-to-Text Process

Upon completion of the process of speech-to-speech matching, yielding M best matches from the database, the output of the relevant text is obtained by post-processing (19) of the attached text to the M records, for example, by finding the common dominator of the M members.

As an example, if the match yielded the following M=10 attached text records:

This dog is fast
This car is parking
Is it barking
This is a dog
It was barking
This is a king
His dog is playing
He is barking
This dog is nothing
This frog is pink The output text to the provided input speech-segment will be:

. . . this dog is barking . . . .

The proposed System for speech-to-text constitutes a major paradigm-shift from existing approaches to the design of prior art speech-to-text systems in several aspects. First, it is not model-based, i.e. no models are generated for phonemes, key-words, speech-context, and/or language. Instead, signatures generated for various speech-fragments, extract this information, which is later easily retrieved by low-cost database operations during the recognition process. This yields a major computational advantage in that no expert-knowledge of speech understanding is required during the training process, which in the disclosed method and its embodiment is signature generation. Second, the System does not require an inference of the input speech-segment to each of the generated models. Instead, for example, the Robust Signature generated for the input segment is matched against the whole database of signatures, in a way which does not require a complexity greater than O(log N). This yields inherent scalability characteristics of the System, and extremely short response times.

Synthesis for Generation of Large-scale "Knowledge" Databases

One of the main challenges in developing speech-to-text systems, with superior performance, is the process of collecting a large-scale and heterogeneous enough, "training" database. In the disclosed embodiments, an innovative approach for meeting this challenge is presented. For the purpose of large-scale database generation of transcribed speech, a prior art synthesizer is used. A synthesizer receives two inputs: (1) Large text database (2) Speech data-base with multiple speakers, intonations, etc. The synthesizer also generates a large database of heterogeneous speech, transcribed according to the provided text database. The generated large-scale database of transcribed speech is used according to the presented System flow.

Large-scale Classification Paradigm-Shift

The presented System implements a computational paradigm-shift required for classification tasks of natural signals, such as video and speech, at very large scales of volume and speed. For very large-scale tasks, such as the classification tasks related to the web content and/or any other large-scale database in terms of volume and update frequencies, the required performance envelope is extremely challenging. For example, the throughput rate of The System signature generation process should be equal to the rate of update process of the content database. Another example is the false-alarm or false-positive rate required for the System to be effective. A 1% false-positive rate for a certain content-segment may turn to 100% false-positive rate for a data-base of N content-segments being matched against another large-scale data-base. Thus, the false-positive rates should be extremely low. The presented System does afford such a low false-positive rate due to the paradigm-shift in its computational method for large-scale classification tasks. Unlike prior art learning systems, which generate a complex hyper-plane separating a certain class from the entire "world", and/or model-based method, which generate a model of a certain class, the presented System generates a set of Robust Signatures for the presented samples of the class according to teachings described above. Specifically, the signatures are generated by maximally independent, transform/distortions-invariant, and signal-based characteristics of optimally designed computational cores. The generalization from a certain set of samples to a class is well defined in terms of invariance to transforms/distortions of interest, and the signatures' robustness, yielding extremely low false-positive rates. Moreover, the accuracy is scalable by the signatures length due to the low dependence of the computational cores.

Figure 7:
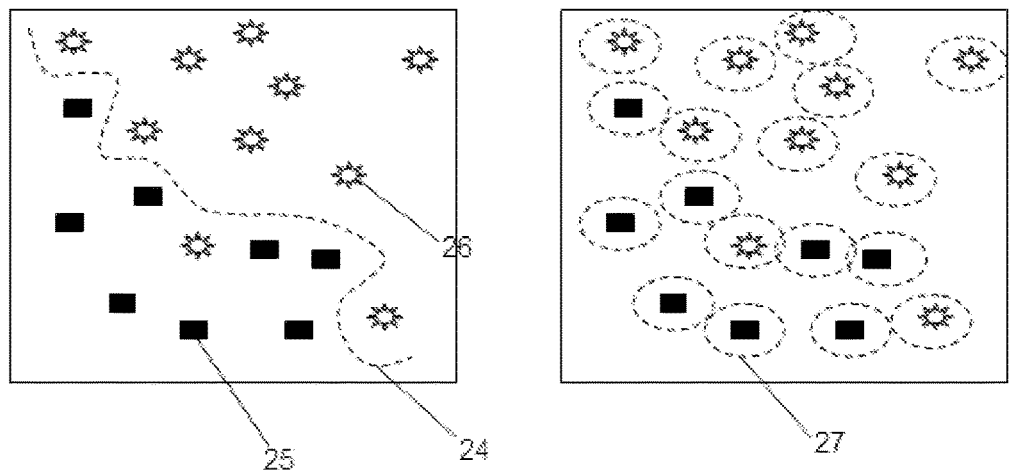
FIG. 7 is a diagram showing the difference between complex hyper-plane generated by prior art techniques, and the large-scale classification techniques of the disclosed embodiments where multiple robust hyper-plane segments are generated.
Figure 8:
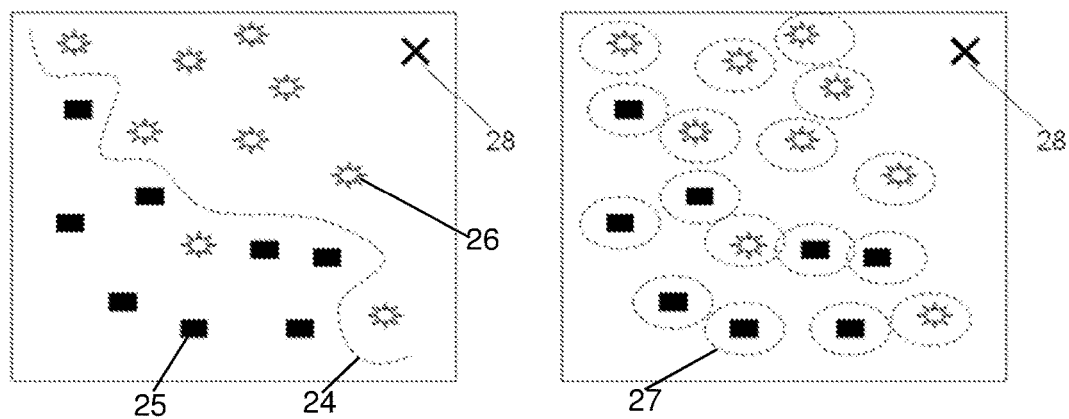
FIG. 8 is a diagram showing the difference in decision making using prior art techniques and the disclosed embodiments, when the sample to be classified differs from other samples that belong to the training set.
Figure 9:
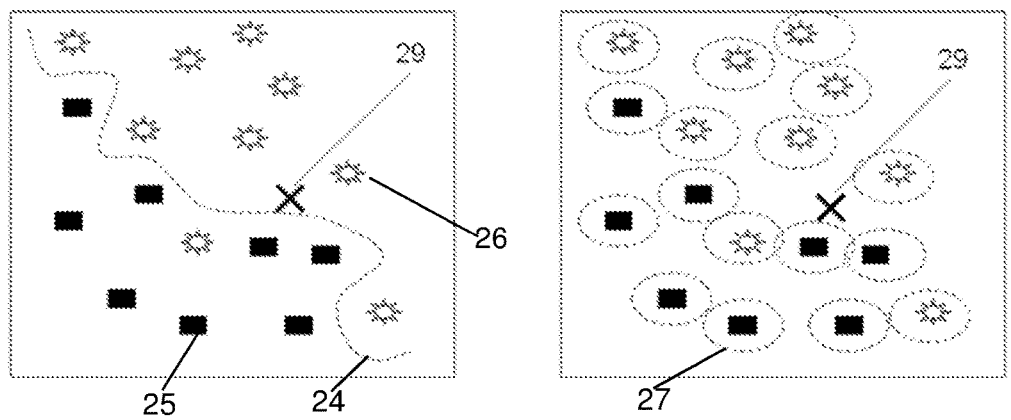
FIG. 9 is a diagram showing the difference in decision making using prior art techniques and the disclosed embodiments, in cases where the sample to be classified closely resembles samples that belong to two classes.

Several differences between the prior art techniques and the scale classification techniques disclosed herein are illustrated in FIGS. 7, 8, and 9. Specifically, FIG. 7 shows a diagram illustrating the difference between a complex hyper-plane the large-scale classification where multiple robust hyper-plane segments and are generated, where the prior art classification is shown on the left and the classification according to the principles of the disclosed embodiments is shown on the right. Prior art classification attempts to find a sophisticated classification line (24) that best separates between objects (25) belonging to one group and objects (26) that belong to another group. Typically, one or more of the objects of one group are found to be classified into the other group, in this example, there is an object (26) within the group of different objects (25). In accordance with an embodiment of the disclosure, each object is classified separately (27) and matched to its respective objects. Therefore, an object will belong to one group or another providing for a robust classification.

FIG. 8 illustrates the difference in decision making when the sample to be classified differs from other samples that belong to the training set, where the prior art classification is shown on the left and the classification according to the principles of the disclosed embodiments is shown on the right. When a new object (28), not previously classified by the system is classified according to prior art as belonging to one group of objects, in this exemplary case, objects (26). In accordance with the disclosed embodiments, as the new object (28) does not match any object (27) it will be recorded as unrecognized, or no match.

FIG. 9 shows the difference in decision making in cases where the sample to be classified closely resembles samples that belong to two classes, prior art classification shown on the left and classification according to the principles of the disclosed embodiments on the right. In this case the new object (29) is classified by prior art systems as belonging to one of the two existing, even though line (24) may require complex computing due to the similarity of the new object (29) to wither one of the objects (25) and (26). However, in accordance with an embodiment of the disclosed embodiments, as each object is classified separately (27) it is found that the new object (29) does not belong to any one of the previously identified objects and therefore no match is found.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A system for generating a large-scale database of heterogeneous speech, comprising:
    a processor;
    a plurality of independent computation cores configured to generate signatures of a plurality of speech segments;
    a large scale database configured to maintain a plurality of transcribed multimedia signals;
    a memory, the memory containing instructions that, when executed by the processor, configure the system to:
    randomly select a plurality of speech segments from the plurality of multimedia signals, wherein each speech segment of the plurality of speech segments is of a random length;
    provide the plurality of speech segments to the plurality of independent computation cores for generation of the signatures;
    collect the signatures from the plurality of independent computation cores; and
    populate the large-scale database with the plurality of signatures respective of the plurality of multimedia signals.

2. The system of claim 1, wherein the system is further configured to: transcribe the plurality of multimedia signals retrieved from the large scale database and a speech database.

3. The system of claim 1, wherein the large scale database multimedia signal comprises speech that is pronounced according to any of: a plurality of speakers, a plurality of intonations, and a plurality of accents.

4. The system of claim 1, wherein each signature of the generated signatures is robust to any of: noise, and distortion.

5. The system of claim 1, wherein each signature of the generated signatures is independent, transform invariant, and distortion invariant.

6. The system of claim 1, wherein the system is further configured to: determine, for each multimedia signal of the plurality of multimedia signals, if the multimedia signal matches at least one class of multimedia signals based on the plurality of signatures and a set of representative signatures of the class of multimedia signals.

7. The system of claim 6, wherein the system is further configured to: create a new class of multimedia signals, wherein the new class of multimedia signals comprises the plurality of signatures as new representative signatures of the new class of multimedia signals.

8. The system of claim 1, wherein each multimedia signal of the plurality of multimedia signals is at least any of: an audio stream, and an audio clip.

9. The system of claim 1, wherein the plurality of independent computation cores are configured to map the plurality of speech segments onto a high-dimensional space for generation of compact signatures.

10. The system of claim 1, wherein the plurality of computation cores are sensitive to a spatio-temporal structure of the plurality of speech segments.

11. A method for generating a large-scale database of heterogeneous speech, comprising:
    randomly selecting a plurality of speech segments from a plurality of transcribed multimedia signals, wherein each speech segment of the plurality of speech segments is of a random length;
    generating, by a plurality of independent computation cores, signatures of the plurality of randomly selected speech segments; and
    populating a large-scale database with the plurality of signatures respective of the plurality of multimedia signals.

12. The method of claim 11, further comprising: transcribing a plurality of multimedia signals retrieved from a large text database and a speech database.

13. The method of claim 11, wherein the speech database further comprises: speech that is pronounced according to any of: a plurality of speakers, a plurality of intonations, and a plurality of accents.

14. The method of claim 11, wherein each signature of the generated signatures is robust to any of: noise, and distortion.

15. The method of claim 11, wherein each signature of the generated signatures is independent, transform invariant, and distortion invariant.

16. The method of claim 11, further comprising: determining, for each multimedia signal of the plurality of multimedia signals, if the multimedia signal matches at least one class of multimedia signals based on the plurality of signatures and a set of representative signatures of the class of multimedia signals.

17. The method of claim 16, further comprising: creating a new class of multimedia signals, wherein the new class of multimedia signals comprises the plurality of signatures as new representative signatures of the new class of multimedia signals.

18. The method of claim 11, wherein each multimedia signal of the plurality of multimedia signals is at least any of: an audio stream, and an audio clip.

19. The method of claim 11, wherein the signatures of the plurality of randomly selected speech segments are generated by a plurality of independent computation cores.

20. The method of claim 19, wherein further comprising: configuring the plurality of independent computation cores to map the plurality of speech segments onto a high-dimensional space for generation of compact signatures.

21. The method of claim 11, wherein the signatures are generated by a plurality of computation cores, wherein the computation cores are sensitive to a spatio-temporal structure of the plurality of speech segments.

22. A non-transitory computer readable medium having stored thereon instructions for causing one or more processing units to execute the method according to claim 11.

23. The system according to claim 1 wherein the plurality of independent computation cores comprise neural networks and the signatures of the plurality of speech segments represents responses of the neural networks to the plurality of speech segments.

24. The method according to claim 11 wherein the plurality of independent computation cores comprise neural networks and the signatures of the plurality of speech segments represents responses of the neural networks to plurality of speech segments.

* * * * *